(12) United States Patent
Lu et al.

(10) Patent No.: US 10,648,689 B2
(45) Date of Patent: May 12, 2020

(54) ENVIRONMENT CONTROL SYSTEM AND METHOD OF GUIDING OCCUPANT TO MAKE DEMAND RESPONSE TO ENVIRONMENT STATUS THEREOF

(71) Applicant: DELTA ELECTRONICS, INC., Taoyuan (TW)

(72) Inventors: Yung-Cheng Lu, Taoyuan (TW); Te-Ju Pan, Taoyuan (TW); Hua-Yi Hsieh, Taoyuan (TW); Yuan-Ping Hsieh, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 161 days.

(21) Appl. No.: 15/968,025

(22) Filed: May 1, 2018

(65) Prior Publication Data

US 2018/0320917 A1     Nov. 8, 2018

Related U.S. Application Data

(60) Provisional application No. 62/501,226, filed on May 4, 2017.

(51) Int. Cl.
*F24F 11/52* (2018.01)
*G05B 13/02* (2006.01)
(Continued)

(52) U.S. Cl.
CPC .............. *F24F 11/52* (2018.01); *F24F 11/63* (2018.01); *G05B 13/024* (2013.01); *G05B 15/02* (2013.01);
(Continued)

(58) Field of Classification Search
None
See application file for complete search history.

(56) References Cited

U.S. PATENT DOCUMENTS

| 2007/0138307 A1* | 6/2007 | Khoo | ................ F24F 11/30 236/1 C |
|---|---|---|---|
| 2014/0075052 A1 | 3/2014 | Kris | |

(Continued)

FOREIGN PATENT DOCUMENTS

| CN | 104539720 A | 4/2015 |
|---|---|---|
| JP | 2007107782 A | 4/2007 |

(Continued)

*Primary Examiner* — Ryan A Jarrett
(74) *Attorney, Agent, or Firm* — Muncy, Geissler, Olds & Lowe, PC

(57) ABSTRACT

An environment control system and a method of guiding occupant to make demand response to environment status thereof are provided. The system includes an external apparatus, a wireless apparatus, a control host and an electronic apparatus. The external apparatus adjusts an environmental status, and the wireless apparatus broadcasts a trigger message in a wireless network. The electronic apparatus outputs a feedback notification after receiving the trigger message, generates corresponding feedback data, and transfers the feedback data to the control host. The control host receives a plurality of the feedback data from the electronic apparatus and executes a statistic analysis process for obtaining analysis data. The present disclosed example has ability of making people with stronger intention in response to environment status and improving accuracy of the responses via actively giving notice for assisting people in instant feedback when people are in the environment.

20 Claims, 9 Drawing Sheets

(51) Int. Cl.

| | |
|---|---|
| *F24F 11/63* | (2018.01) |
| *G05B 15/02* | (2006.01) |
| *H05B 47/19* | (2020.01) |
| *H05B 47/105* | (2020.01) |
| *H04L 29/06* | (2006.01) |
| *F24F 120/20* | (2018.01) |
| *H04W 76/10* | (2018.01) |
| *G06F 3/0484* | (2013.01) |

(52) U.S. Cl.
CPC ....... *H04L 65/1073* (2013.01); *H05B 47/105* (2020.01); *H05B 47/19* (2020.01); *F24F 2120/20* (2018.01); *G05B 2219/2642* (2013.01); *G06F 3/0484* (2013.01); *H04W 76/10* (2018.02)

(56) References Cited

U.S. PATENT DOCUMENTS

| | | |
|---|---|---|
| 2016/0132898 A1 | 5/2016 | Cadieux et al. |
| 2019/0128552 A1* | 5/2019 | Zhao .................. F24F 11/50 |
| 2019/0278310 A1* | 9/2019 | Lalanne .............. G05B 15/02 |

FOREIGN PATENT DOCUMENTS

| | | | |
|---|---|---|---|
| JP | 2009206549 A | 9/2009 | |
| JP | 2011028547 A | 2/2011 | |
| JP | 2013179382 A | 9/2013 | |
| JP | 2016200373 A | 12/2016 | |
| TW | 201316175 A | 4/2013 | |

\* cited by examiner

ENVIRONMENT CONTROL SYSTEM AND METHOD OF GUIDING OCCUPANT TO MAKE DEMAND RESPONSE TO ENVIRONMENT STATUS THEREOF

CROSS REFERENCE TO RELATED APPLICATIONS

This application claims priority of U.S. Provisional Application No. 62/501,226 filed on May 4, 2017 under 35 U.S.C. § 119(e), the entire contents of all of which are hereby incorporated by reference.

BACKGROUND OF THE INVENTION

Field of the Invention

The technical field relates to a control system and a method therefor, and more particularly related to an environment control system and a method of guiding occupant to make demand response to environment status thereof.

Description of Related Art

The conventional environment control system (such as integrated lighting system or central air-conditioning system) is configured as that its control parameters are not allowed to be modified by any person except the administrator.

Besides, the feelings of the different people for the same environment are not exactly the same. For making the environmental status meet the expectations of all people in the building as far as possible, the administrator must collect feedback from all people, and analyze a lot of collected feedback manually for determining how to adjust the control parameters of the environment control system.

In general, the administrator collects feedback from all people in a manner of paper questionnaire or online questionnaire periodically (such as one time per week or one time per month). However, the above-mentioned manner may reduce the intention of people making demand response to the environment status caused by the complex procedure.

Moreover, people can't make demand response to the environment status instantly no matter they satisfy the current feeling of the environment or not, but only can make demand response in next questionnaire. However, people will forget the feeling of the environment at the time when answering the questionnaire, such that the accuracy of the feeling of the environment responded by people will reduce.

Accordingly, there is currently a need for an environment control system having an ability of guiding people to make demand response to the environment status instantly.

SUMMARY OF THE INVENTION

One of the embodiments, an environment control system, comprises an external apparatus, a wireless apparatus arranged in the same environment as the external apparatus, a control host connected to the external apparatus and the wireless apparatus via a second network, and a computer program installed in an electronic apparatus. The external apparatus is configured to adjust an environmental status according to a control parameter. The wireless apparatus is configured to broadcasting in a wireless manner a trigger message in a first network. The control host is configured to receive a plurality of feedback data corresponding to the control parameter and/or the environmental status, execute a statistic analysis process on the pluralities of the feedback data for obtaining analysis data, and store the analysis data. The computer program is configured to control the electronic apparatus to output a feedback notification after receipt of the trigger message via the first network, control the electronic apparatus to generate the corresponding feedback data after receipt of a feedback operation instructing a feedback of feeling of the environment, and control the electronic apparatus to transfer the feedback data via the second network.

One of the embodiments, a method of guiding occupant to make demand response to environment status applied to an environment control system comprising an external apparatus, a wireless apparatus arranged in the same environment as the external apparatus, a control host and a computer program installed in an electronic apparatus, comprises following steps: adjusting an environmental status according to a control parameter at an external apparatus; broadcasting a trigger message in a first network at a wireless apparatus; controlling the electronic apparatus to output a feedback notification after receipt of the trigger message from the first network via execution of the computer program; generating feedback data corresponding to the control parameter and/or the environmental status after receipt of a feedback operation instructing a feedback of feeling of the environment, and transferring the feedback data to the control host via the second network; and, receiving a plurality of the feedback data corresponding to the control parameter and/or the environmental status, execute a statistic analysis process on the pluralities of the feedback data for obtaining analysis data, and store the analysis data.

The present disclosed example has ability of making people has stronger intention in response to environment status and improving accuracy of the responses via actively giving notice for assisting people in instant feedback when people are in the environment.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims are all covered by the claims claimed by the present disclosed example.

The present disclosed example provides an environment control system, the environment control system is mainly applied to execute a method of guiding occupant to make demand response to environment status (referred to as guiding method in following description) for adjusting an environmental status, actively giving a notice for assisting the person in instant feedback of the current environment when the person is in the environment, so as to collect the feelings of the current environment status from the person effectively and be beneficial to the following statistics and analysis.

Please be noted that the person referred to the present disclosed example means one or more person(s) having ability of feeling the current environmental status.

Figure 1:
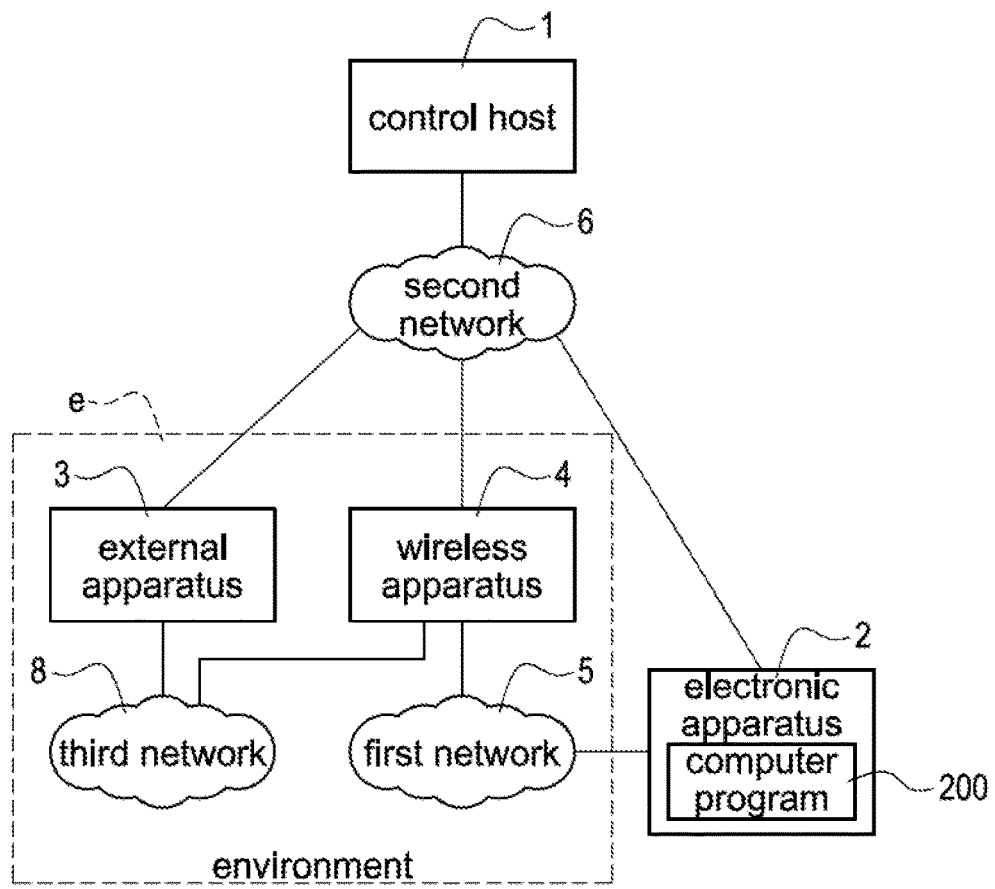
FIG. 1 is an architecture diagram of an environment control system according to one embodiment of the present disclosed example.
Figure 2:
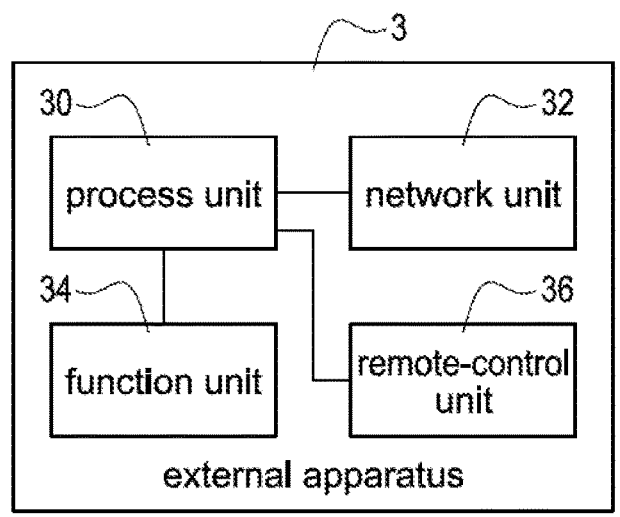
FIG. 2 is an architecture diagram of an external apparatus according to one embodiment of the present disclosed example.
Figure 3:
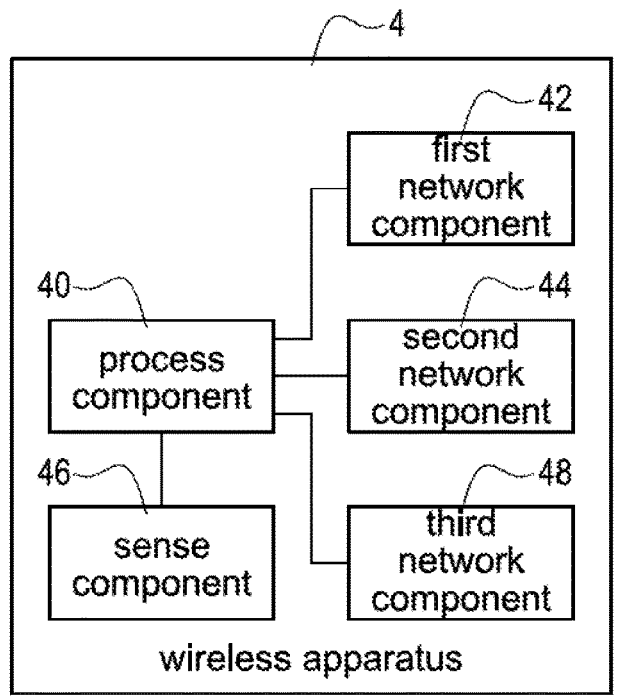
FIG. 3 is an architecture diagram of a wireless apparatus according to one embodiment of the present disclosed example.
Figure 4:
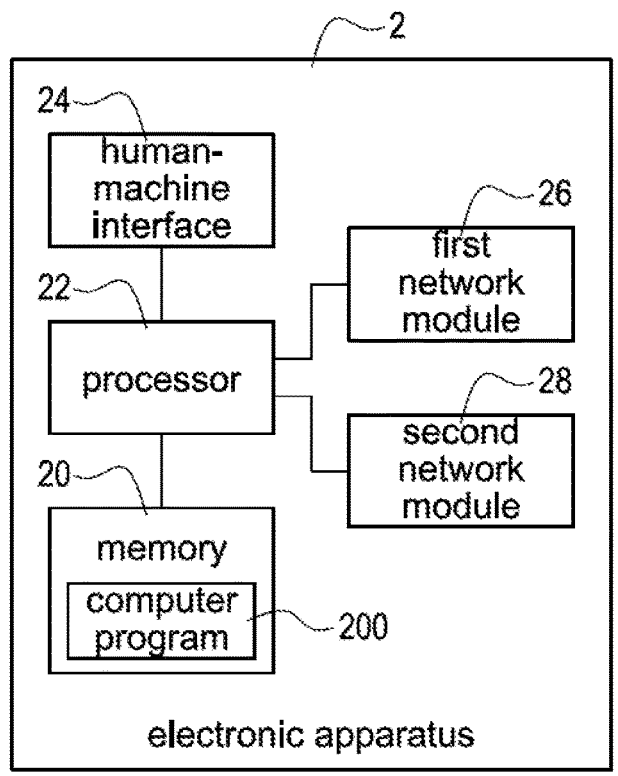
FIG. 4 is an architecture diagram of an electronic apparatus according to one embodiment of the present disclosed example.

Please refer to FIG. 1 to FIG. 4. FIG. 1 is an architecture diagram of an environment control system according to one embodiment of the present disclosed example, FIG. 2 is an architecture diagram of an external apparatus according to one embodiment of the present disclosed example, FIG. 3 is an architecture diagram of a wireless apparatus according to one embodiment of the present disclosed example, and FIG. 4 is an architecture diagram of an electronic apparatus according to one embodiment of the present disclosed example.

The environment control system (such as air purification system, lighting system or air conditioning system) of the present disclosed example mainly comprises a control host 1, an external apparatus 3, a wireless apparatus 4 and a computer program 200.

The external apparatus 3, such as fan, light fixture or other controllable apparatus, is arranged in the environment e and is configured to adjust an environmental status, such as temperature or brightness, of the environment e. More specifically, the external apparatus 3 may comprise a network unit 32, a function unit 34 and a process unit 30 electrically connected to above units.

The network unit 32 is configured to connect to the network and transfer data via network, such as receipt of a control parameter (such as wind speed level or illumination level) from the control host.

One of the exemplary embodiments, the network unit 32 may be connected to a second network 6, and execute transmission with the control host 1 via the second network 6 directly.

One of the exemplary embodiments, the wireless apparatus 4 may be connected to the control host 1 via the second network 6. Moreover, the network unit 32 of the external apparatus 3 may be connected to the wireless apparatus 4 via the third network 8. Thus, the wireless apparatus 4 be as a bridge apparatus between the control host 1 and the wireless apparatus 3, and have ability of forwarding data from control host 1 to the external apparatus 3 (such as transmission of the control parameter) or reverse. Thus, the external apparatus 3 has ability of transferring data with the control host 1 via the wireless apparatus 4 even the external apparatus 3 does not be connected to the second network 6 (such as the internet) directly.

The process unit 30 is configured to control the external apparatus 3, such as controlling an operating status of the function unit 34 (such as motor of the fan or power switch of the light fixture) according to the control parameter for adjusting the environmental status (such as temperature or brightness) of the environment e which the external apparatus 3 is arranged.

One of the exemplary embodiments, the external apparatus further comprises a remote-control unit 36 electrically connected to the process unit 30. The remote-control unit 36 was paired with an external remote-controller (not shown in figures) in advance and has the ability of receiving the said control parameter(s) from the remote-controller.

The wireless apparatus 4 and the external apparatus 3 are arranged in the same environment e. The wireless apparatus 4 is configured to broadcast a trigger message in the wireless first network 5 continuously. The trigger message is used to make the electronic apparatus 2 recognize the environment e which the electronic apparatus is located. More specifically, the wireless apparatus 4 may comprise a first network component 42, a second network component 44, a third network component 48 and a process component 40 electrically connected to above components. The first network component 42 is configured to connected to the first network 5, the second network component 44 is configured to connect to the second network 6, the third network component 48 is configured to connect to the third network 8. The process component 40 is configured to control the wireless apparatus 4.

One of the exemplary embodiments, the trigger message may record the environment-related information (such as number or coordinate of the environment e which the wireless apparatus 4 is arranged) or a set of identification codes of the wireless apparatus 4. The identification codes of the wireless apparatus 4 may be Universally Unique Identifier (UUID), MAC address, PIN for pairing, Service Set Identifier (SSID) or the other type of identification codes.

Take the wireless apparatus 4 being Bluetooth beacon for example, the wireless apparatus 4 may broadcast the trigger message in the first network 5 (such as Bluetooth network) based on the Bluetooth communication standard continuously, the trigger message may comprise the UUID of the wireless apparatus 4.

Take the wireless apparatus 4 being Wi-Fi router for example, the wireless apparatus 4 may establish the first network 5, broadcast the trigger message in the first network 5 (such as Wi-Fi network) based on the Wi-Fi communication standard continuously, the trigger message may comprise the SSID of the wireless apparatus 5.

One of the exemplary embodiments, the wireless apparatus 4 may further comprise sense component 46 electrically connected to the process component 40. The sense component 46 may be one or more environmental sensor(s), such as thermometer, hygrometer, illuminometer, enthalpy meter, or the other environmental sensors, and have ability of sensing the current environment status, such as temperature, humidity, brightness, enthalpy, or the other sensing values. Moreover, the process component 40 may execute numeralization on the sensed environment status, and upload the environment status after numeralization to the control host 1 via the second network component 44 regularly (such as uploading every eight o'clock in the morning or one time per hour) or irregularly (such as uploading every time sense 100 environment status cumulatively or uploading if receipt of user operation).

One of the exemplary embodiments, the sense component 46 is a human detector (such as camera, PIR sensor, ultrasonic sensor, thermal imager, or the other human detectors), and has ability of sensing whether any person enters or leaves the environment e. The sense component 46 may give the corresponding trigger message if detecting that any person enters or leaves the environment e. More specifically, the sense component 46 may send a first trigger message to the process component 40 for making the process component 40 start to broadcast above-mentioned trigger message via the first network component 42 if detecting that any person enters the environment e. Moreover, the sense component 46 may send a second trigger message to the process component 40 for making the process component 40 stop broadcasting above-mentioned trigger message via the first network component 42 if detecting that any person leaves the environment e. Thus, the wireless apparatus 4 has ability of automatically stopping broadcasting the trigger message for effectively saving the power consumption if no one is in the environment e.

Please be noted that the external apparatus 3 and the wireless apparatus 4 may be arranged separately or in the same case, but this specific example is not intended to limit the scope of the present disclosed example. Moreover, the wireless apparatus 4 is not necessary to be arranged the third network component 48 (namely, the external apparatus 3 and the wireless apparatus 4 have ability of communicating with each other without the third network 8) if the external apparatus 3 and the wireless apparatus 4 are arranged in the same case.

The computer program 200 is installed in the memory 20 of each of the electronic apparatus 2, and may interact with the other devices of the environment control system for assisting the person holding the electronic apparatus 2 in feedback for the current environmental status.

More specifically, the electronic apparatus 2 may comprise a memory 20 configured to store data, a human-machine interface 24 (such as touchscreen, speaker, keypad, indicator light or the other input/output components) for inputting/outputting information, a first network module 26 configured to be connected to the first network 5, a second network module 28 configured to the connect the second network 6, and a processor 22 electrically connected to above components and configured to control the electronic apparatus 2.

One of the exemplary embodiments, the first network 5 may be Wi-Fi network, Bluetooth network, Zig-bee network or the other wireless Personal Area Network (WPAN) having characteristics of small transmission range. Both the first network component 42 and the first network module 26 are the connection modules compatible with above communication standard. Moreover, the second network 6 may be Wi-Fi network, Ethernet network, the internet or the other communication network having characteristics of high-speed transmission. All the second network component 44, the second network module 28, the network unit 32 and the transmission apparatus 104 described later are the connection modules compatible with above communication standard. Moreover, the third network 8 may be Wi-Fi network, Bluetooth network, Zig-Bee network, Ethernet network or the other wired/wireless network. Both the third network component 48 and the network unit 32 are the connection modules compatible with above communication standard.

One of the exemplary embodiments, a maximum transmission speed in the second network 6 is faster than a maximum transmission speed in the first network 5. Furthermore, a communication standard of the second network 6 is incompatible with a communication standard of the first network 5. In other words, a network type of the first network 5 is different from a network type of the second network 6, such that the first network 5 and the second network 6 cannot connect to each other.

Please be noted that each of the electronic apparatus 2 and the wireless apparatus 4 must comprise two different types of network modules simultaneously (one is the first network component 42 and the first network module 26, another is the second network component 44 and the second network module 28) because the first network 5 and the second network 6 are the different types of communication networks in above-mentioned embodiment. Thus, each of the electronic apparatus 2 and the wireless apparatus 4 has ability of connecting to the first network 5 and the second network 6 simultaneously, but this specific example is not intended to limit the scope of the present disclosed example.

One of the exemplary embodiments, each of the electronic apparatus 2 and the wireless apparatus 4 may only comprise single network module (such as only the first network component 42 and the first network module 26 are comprised) if the first network 5 and the second network 6 are the same type of the communication network (such as Wi-Fi network).

One of the exemplary embodiments, the first network 5, the second network 6 and the third network 8 are the different types of communication network, so the wireless apparatus 4 must comprise three types of network modules (such as the first network component 42, the second network component 44, and the third network component 48) for connecting to the first network 5, the second network 6 and the third network 8 simultaneously, but this specific example is not intended to limit the scope of the present disclosed example.

One of the exemplary embodiments, the first network 5 and the third network 8 are the same types of communication network or the same communication network. In other words, the electronic apparatus 2, the external apparatus 3 and the wireless apparatus 4 are configured to connect the same network, and have ability of communicating with each other. Moreover, only two different types of network modules (the first component 42 and the second network component 44) must be arranged in the wireless apparatus 4, the third network component 48 is not necessary to be arranged in the wireless apparatus 4.

One of the exemplary embodiments, the memory 20 is a non-transient computer-readable recording media, a plurality of computer-readable codes is recorded in the computer program 200. The processor 22 may further implement the guiding method of the present disclosed example via the execution of the computer-executable codes.

Figure 5:
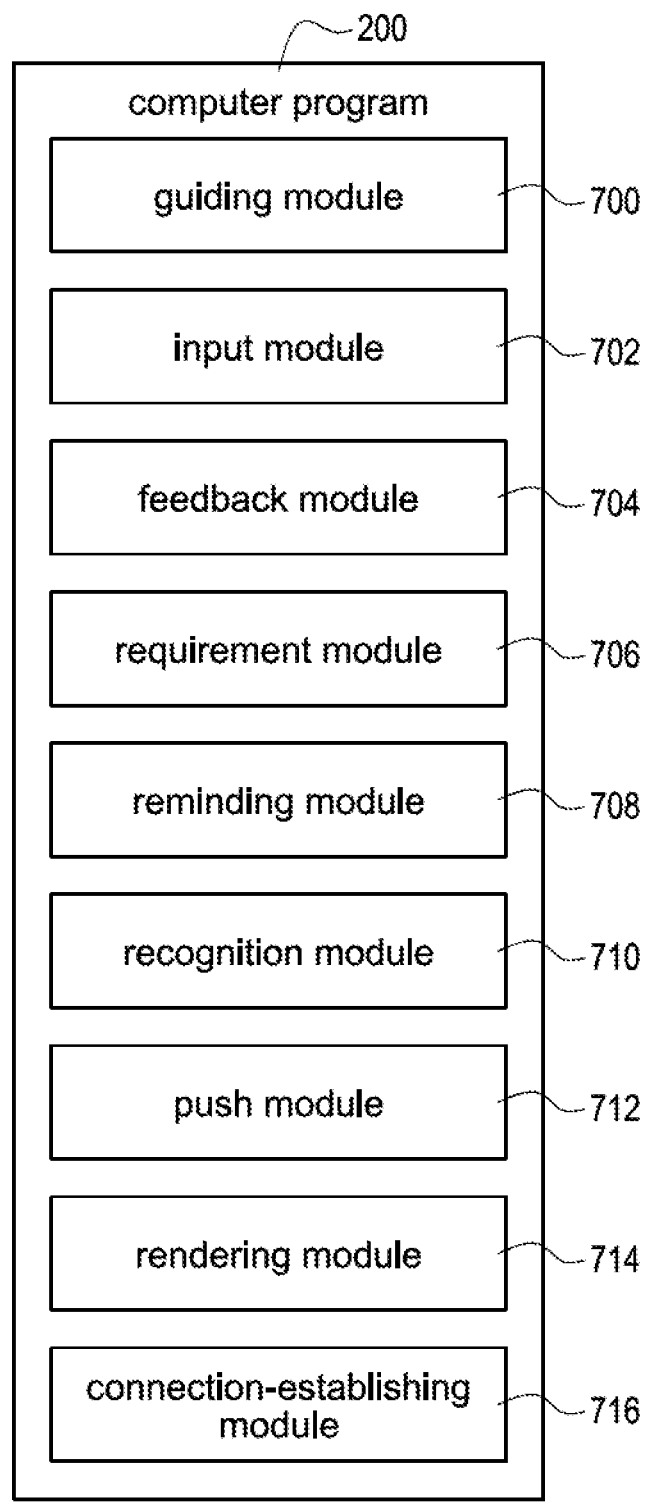
FIG. 5 is an architecture diagram of a computer program according to one embodiment of the present disclosed example.

Please refer to FIG. 5 simultaneously, which is an architecture diagram of a computer program according to one embodiment of the present disclosed example. More specifically, the processor 22 mainly interacts with the other apparatus of the environment control system via execution of the computer program 200 for implementing each of the functions of the guiding method of the present disclosed example. Moreover, above computer program 200 may be divided into following function modules according to the different functions.

1. A guiding module 700 is configured to detect whether the electronic apparatus 2 receives the trigger message from the wireless apparatus 4, and controls the electronic apparatus 2 to output a feedback notification for indicating the person to input the feedback operation if receipt of the trigger message.

2. An input module 702 is configured to control the electronic apparatus 2 to receive the feedback operation form the person, and generate the corresponding feedback data according to the feedback operation. One of the exemplary embodiments, the input module 702 receives the feedback operation via the GUI (Graphical User Interface) rendered by the rendering module 714.

3. A feedback module 704 is configured to control the electronic apparatus 2 to upload the generated feedback data to the control host 1.

One of the exemplary embodiments, the feedback module 704 is configured to control the electronic apparatus 2 to connect to the second network 6 and transfer the feedback data to the control host 1 via the second network 6.

One of the exemplary embodiments, the feedback module 704 is configured to control the electronic apparatus 2 to transfer the feedback data to the wireless apparatus 4 via the wireless connection established by the connection-establishing module 716 for making the wireless apparatus 4 forward the feedback data to the control host 1 via the second network 6.

4. A requirement module 706 is configured to control the electronic apparatus 2 to generate a parameter-getting requirement and/or a status-getting requirement according to the identification codes of the wireless apparatus 4, and send the parameter-getting requirement and/or the status-getting requirement, such as sending the parameter-getting requirement to the control host 1, the external apparatus 3 or the wireless apparatus 4, or sending the status-getting requirement to the control host 1 or the wireless apparatus 4.

5. A reminding module 708 is configured to receive the current control parameter(s) of the wireless apparatus 3 arranged in the same environment e as the electronic apparatus 2 and/or the sensed environmental status of the wireless apparatus 4 of the same environment e after receipt of the trigger message, and display the control parameter or the environmental status in the human-machine interface 24.

6. A recognition module 710 is configured to control the electronic apparatus 2 having installed the computer program 200 to determine whether the identification codes attached to the trigger message is matched with default identification codes, and trigger the guiding module 700 to output a feedback notification if the identification codes are matched with the default identification codes.

7. A push module 712 is configured to be executed if the computer program 200 is in background execution (namely, the human-machine interface 24 does not display an execution screen of the computer program 200). The push module 712 is further configured to control the electronic apparatus 2 to push a first feedback notification for instructing the person to operate the electronic apparatus 2 to make the computer program 200 switch to foreground execution (namely, the human-machine interface 24 displays the execution screen of the computer program 200) if receipt of the trigger message.

After the computer program switches to foreground execution, the guiding module 700 continues to control the electronic apparatus 2 to output a second feedback notification for instructing the person to input the feedback operation.

One of the exemplary embodiments, the recognition module 710 and the push module 712 may implement a recognition function and a push function via an operating system (not shown in figures) installed in the electronic apparatus 2. More specifically, the recognition module 710 may configure one or more default identification code(s) in the operating system, the push module 712 may configure a content (such as specific pictures or texts) of the first feedback notification in the operating system. Thus, the operating system may control the electronic apparatus 2 to compare the received identification codes attached to the trigger message with the default identification codes, and push the first feedback notification if the received identification codes are consistent with the default identification codes.

8. rendering module 714 is configured to be executed when the computer program 200 is in foreground execution. The rendering module 714 is configured to control the electronic apparatus 2 to render the GUI, and display the rendered GUI in the human-machine interface 24 (such as touchscreen or a combination of display and keypad).

9. connection-establishing module 716 is configured to control the electronic apparatus 2 to establish a wireless connection with the wireless apparatus 4 via the first network 5.

Thus, the present disclosed example can implement each function of the guiding method of the present disclosed example via above-mentioned modules, so as to assist the person in making demand response to the current environment status effectively.

Figure 6:
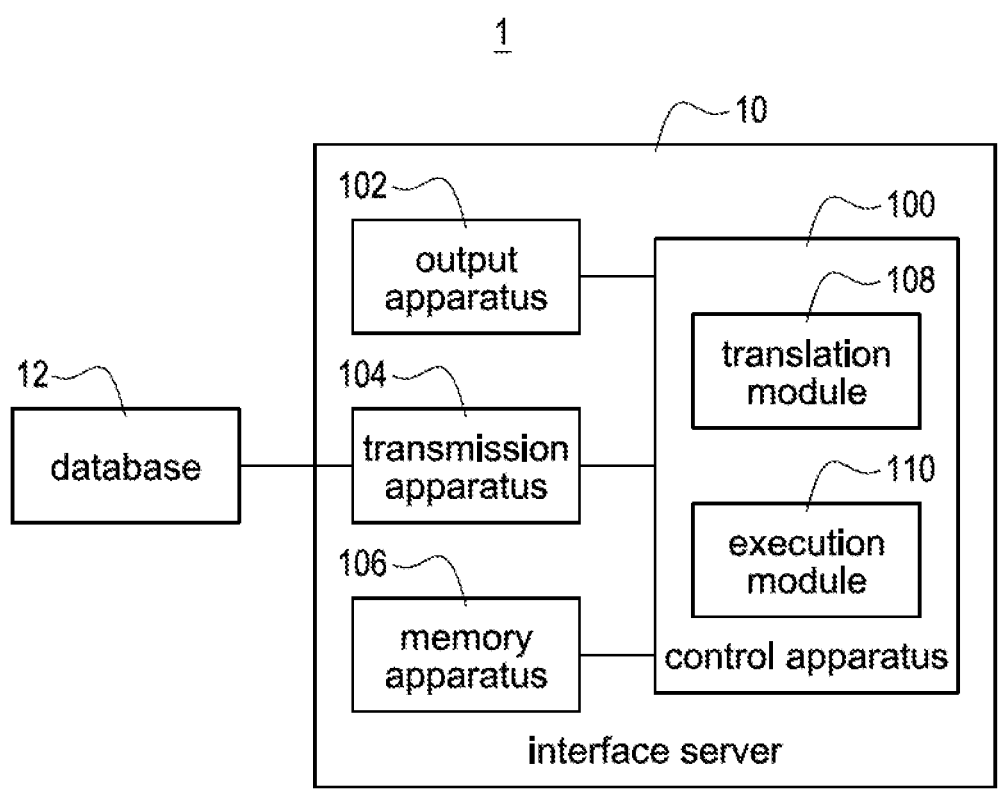
FIG. 6 is an architecture diagram of a control host according to one embodiment of the present disclosed example.

Please refer to FIG. 6, which is an architecture diagram of a control host according to one embodiment of the present disclosed example. In this embodiment, the control host 1 may comprise an interface server 10 and a database 12 connected to the interface server 10. The database 12 may be an independent server and have ability of connecting to the interface server 10 via network (such as local area network or internet) or directly connecting to the interface server 10 via cable (such as Ethernet cable, fiber optic cable, serial transmission cable, USB cable or the other cables having ability of transmitting data or signals). Moreover, the database 12 and the interface server 10 may be arranged in the same or different locations, but this specific example is not intended to limit the scope of the present disclosed example.

More specifically, the administrator may get the operation status and the current configuration of the external apparatus 3 and/or the network devices 4. Furthermore, the administrator may modify the configuration of the external apparatus 3 and/or the network devices 4 via the interface server 10.

One of the exemplary embodiments, the database 12 may be directly arranged in the memory apparatus 106 of the interface server 10. Namely, the interface server 10 has ability of implementing the function of database server at the same time.

The interface server 10 executes data transmission with the other network device (such as the electronic apparatus 2, the external apparatus 3 and/or the wireless apparatus 4) via the second network 6.

One of the exemplary embodiments, the interface 10 may comprise output apparatus 102, transmission apparatus 104, memory apparatus 106 and control apparatus 100 electrically connected to above apparatuses. The output apparatus 102 (such as display, printer, speaker or the other apparatuses having ability of translating data into human-understandable forms) is configured to output data. The transmission apparatus 104 is configured to connect to the second network 6 for executing data transmission with the other network apparatuses. The memory apparatus 106 is configured to store data. The control apparatus 100 is configured to control the interface server 100.

In this embodiment, the interface server 10 further implements a function of library translation. More specifically, each of the function instructions (such as a method structure of program language) of a library is usually configured to implement the low-level or simple functions (such as loading simple data, writing simple data, outputting simple data or render simple graph). If a developer would like to develop a program for implementing the high-level or complex function, a large amount of above function instructions must be called in the program, so that the complexity and difficulty in development of the program increase significantly.

For solving above-mentioned technical program, the interface server 10 is configured to an Application Programming Interface server (API server) in this embodiment, and has ability of translating and executing the received instructions. More specifically, the developer may configure one or more API instruction(s) in advance, each of the instructions is configured to implement the different high-level or complex functions. Thus, the developer determines a plurality of function instructions for implementing each of the high-level or complex functions, configures the determined function instructions to correspond to each of the API instructions, and records a correspondence relationship between above API instruction and the function instructions.

Thus, the developer may directly use the simple API instructions for implementing the high-level or complex functions without the use of a large amount of above-mentioned complex function instructions, so as to reduce the complexity of the program and the difficulty of development significantly.

Take the electronic apparatus 2 sending the feedback data to the interface server 10 for example, the electronic apparatus 2 may add a storing API instruction to the feedback data. Then, the interface server 10 may analyze the feedback data according to the storing API instruction, and store the analyzed feedback data at a specific storage position of the database 12 without calling a large amount of the function instructions.

For making the interface server 10 have ability of understanding above-mentioned API instructions correctly, the control apparatus 100 comprises a translation module 108 and an execution module 110 in this embodiment. Furthermore, a plurality of computer-readable codes is recorded in the memory apparatus 106. The translation module 108 and the execution module 110 may be implemented after the control apparatus 100 execute above-mentioned computer-readable codes.

The translation module 108 is configured to control the interface server 10 to translate each of the received API instructions according to above-mentioned correspondence relationship between the API instructions and the function instructions for obtaining the function instructions corresponding to this API instruction after receipt of each of the API instruction.

The execution module 110 is configured to control the interface server 10 to execute above-mentioned function instructions.

For example, each of the feedback data may comprise a storing API instruction. The translation module 108 may translate the storing API instruction of the feedback data into the function instructions of the library according to above-mentioned correspondence relationship after the interface server 10 receives the feedback data. Then, the execution module 110 executes above-mentioned function instructions obtained by translation to determine classification process on the feedback data, determines classification information of the feedback data, and stores the feedback data in a corresponding data table of the database 12 according to a result of the classification (classification information).

One of the exemplary embodiments, the developer may configure the interface server 10 to execute another computer program for calling a statistic API instruction. The translation module 108 may translate above statistic API instruction into a plurality of statistic function instructions of the library. Then, the execution module 110 may execute above statistic function instructions to execute a statistic analysis process on a plurality of the feedback data for obtaining analysis data, and store the analysis data.

Figure 7:
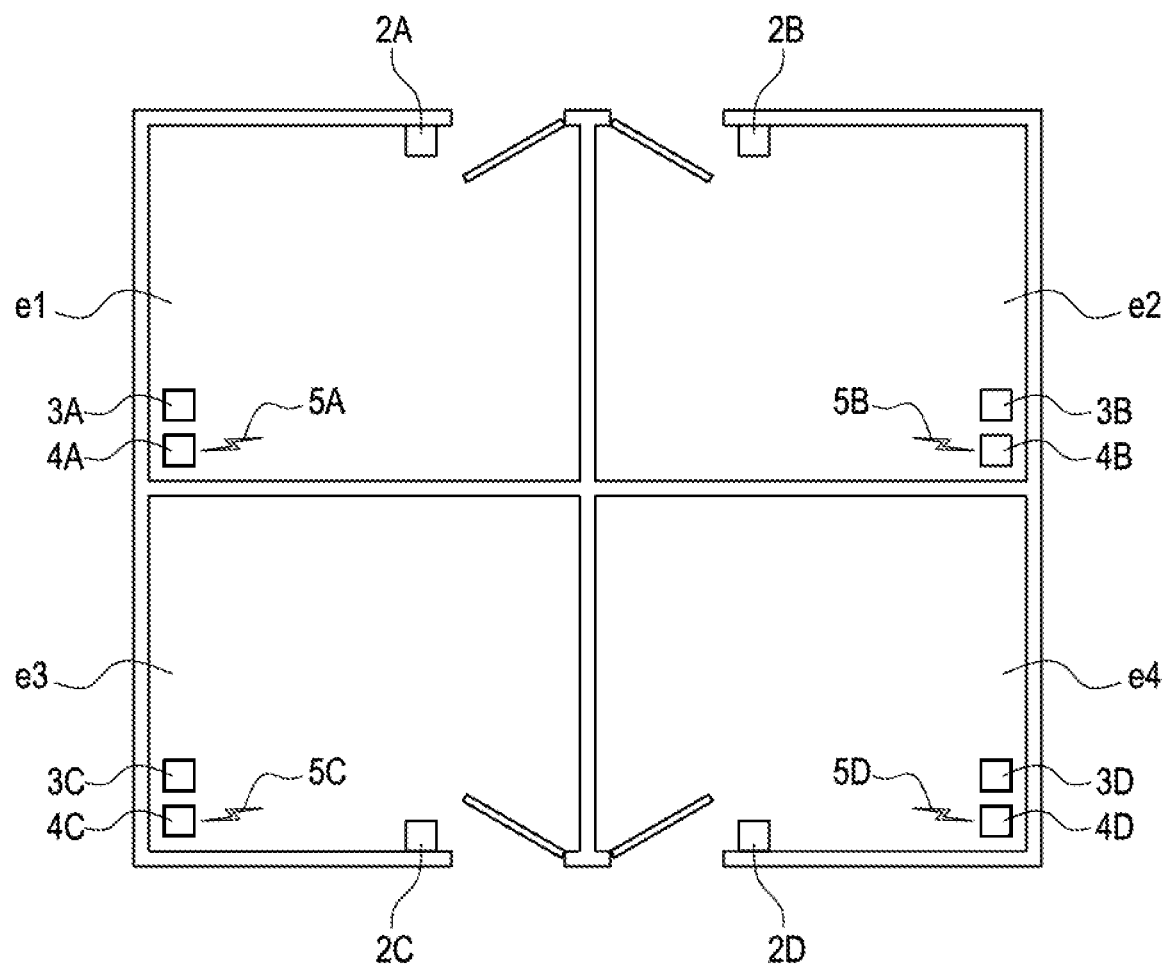
FIG. 7 is a schematic view of applying and arranging an environment control system according to one embodiment of the present disclosed example.

Please refer to FIG. 7 simultaneously, which is a schematic view of applying and arranging an environment control system according to one embodiment of the present disclosed example. In this embodiment, the environment control system may comprise a plurality of external apparatuses 3A-3D and a plurality of wireless apparatuses 4A-4D. Moreover, the external apparatus 3A and the wireless apparatus 4A are arranged in the same environment e1, the external apparatus 3B and the wireless apparatus 4B are arranged in the same environment e2, the external apparatus 3C and the wireless apparatus 4C are arranged in the same environment e3, and the external apparatus 3D and the wireless apparatus 4D are arranged in the same environment e4.

In this embodiment, the electronic apparatus 2 (such as conventional smartphone, tablet, or wearable device used by people) are held by the different people respectively, and are installed the computer program 200 respectively. Each of the wireless apparatuses 4A-4D establishes a wireless first network 5A-5D respectively in the environment e1-e4, and broadcasts own trigger messages in the established first network 5A-5D. Thus, when the person held the electronic apparatus 2 and entered into the different environment e1-e4, the person is also within the communication range of the different first network 5A-5D, so as to receive the trigger message broadcasted by the different wireless apparatus 4A-4D.

For example, the electronic apparatus 2 may receive the trigger message from the wireless apparatus 4A because the electronic apparatus 2 is within a communication range of the first network 5A of the wireless apparatus 4A when the person takes the electronic apparatus 2 having executed the computer program 200 in the environment e1. Then, the electronic apparatus 2 may push a feedback notification automatically for reminding the person to make demand response to environment status of the environment e1 immediately.

Similarly, the electronic apparatus 2 may receive the trigger message from one of the wireless apparatus 4B-4D because the electronic apparatus 2 is within a communication range of one of the first network 5B-5D of one of the wireless apparatus 4B-4D when the person takes the electronic apparatus 2 having executed the computer program 200 in one of the environment e2-e4. Then, the electronic apparatus 2 may push a feedback notification automatically for reminding the person to make demand response to environment status of one of the environment e2-e4 immediately.

The present disclosed example can make people have stronger intention in response to environment status because people may make demand response to environment status by their conventional electronic device 2.

Please be noted that the electronic apparatus 2 may receive a plurality of trigger message of the wireless apparatus 4A-4D simultaneously in the same environment e1-e4 because of the leaky-wave problem in the wireless communication, above status may make the person make the demand response to the incorrect environment e1-e4. To solve above-mentioned problem, in the present disclosed example, each of the wireless apparatuses 4A-4D may add identification information of environment e1-e4 arranged the wireless apparatus 4A-4D to the broadcasted trigger message, add its identification codes to the broadcasted trigger message, or add the identification codes of the external apparatus 3A-3D arranged in the same environment e1-e4 to the broadcasted trigger message. Thus, the electronic apparatus 2 may recognize the environment e1-e4 which the electronic apparatus 2 is in and remind the person according to above information of the trigger message, so as to prevent the person from making the demand response to the incorrect environment e1-e4.

One of the exemplary embodiments, each of the electronic apparatuses (such as the guide machine for each of the environments e1-e4, the remote-controller of each of the external apparatuses 3A-3D or the control dashboard of each of the wireless apparatuses 4A-4D) are fixedly arranged in each of the environments e1-e4 respectively. For example, as shown in FIG. 7, the electronic apparatuses 2A-2D may be arranged at the entrance of the environments e1-e4 respectively. Besides, each of the wireless apparatuses 4A-4D may sense the environmental status of each of the environments e1-e4 via the sense component 46, detect whether any person is in each of the environments e1-e4 via the sense component 46, and broadcast the trigger message if detecting that any person is in each of the environments e1-e4.

Each of the electronic apparatuses 2A-2D may display the feedback notification for guiding the person to make demand response to environment status of the environment e1-e4 which the person is in.

Thus, the person may directly operate the electronic apparatus 2A-2D to make demand response to environment status of the environment e1-e4 after entering any environment e1-e4 without taking any additional electronic apparatus.

Figure 8:
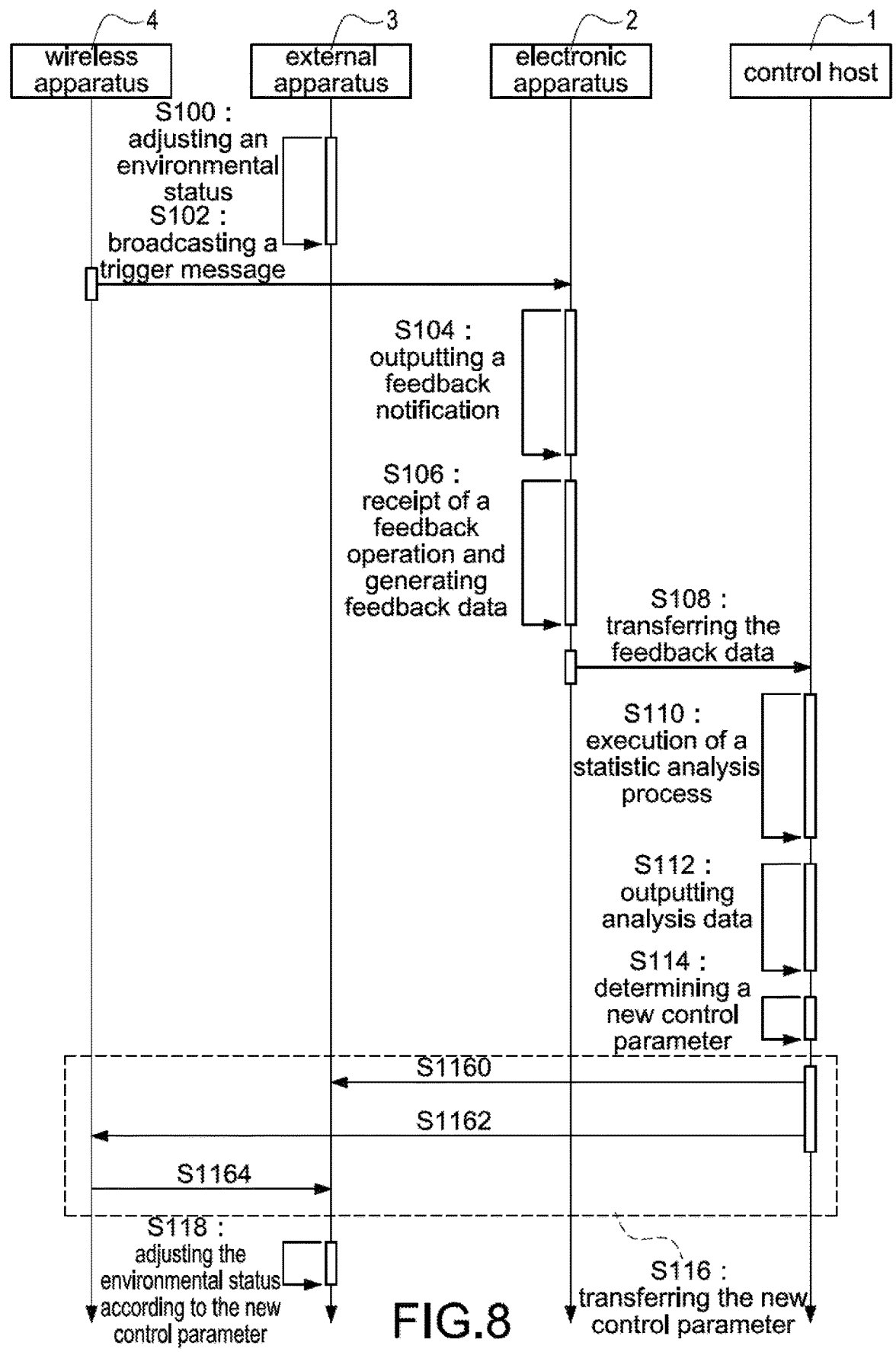
FIG. 8 is a sequence diagram of a method of guiding occupant to make demand response to environment status according to a first embodiment of the present disclosed example.

Please refer to FIG. 8 simultaneously, which is a sequence diagram of a method of guiding occupant to make demand response to environment status according to a first embodiment of the present disclosed example. The guiding method of each embodiment of the present disclosed example may be implemented by the environment control system shown in FIG. 1 to FIG. 7. The guiding method of the first embodiment comprises following steps.

Step S100: the external apparatus 3 adjusts an environmental status according to a control parameter. More specifically, the external apparatus 3 may receive the control parameter from the control host 1 via the second network 6, or receive the control parameter from a remote-controller via the remote-control unit 36. Or, the external apparatus 3 connects to the wireless apparatus 4 via the third network 8, connects to the control host 1 through the wireless apparatus 4 via the second network 6, and receives the control parameter form the control host 1 via above path.

Step S102: the wireless apparatus 4 establishes a first network 5, and broadcasts a trigger message in the first network 5 continuously or intermittently.

Step S104: each of the electronic apparatuses 2 controlled by the guiding module 700 outputs a feedback notification on the human-machine interface 24 if receipt of the trigger message via the first network module 26 and the first network 5.

Step S106: each of the electronic apparatuses 2 controlled by the input module 702 receives a feedback operation of making demand response to environment status from the person via the human-machine interface 24, and generates feedback data corresponding to the current control parameter of the external apparatus 3 according to the received feedback operation.

Step S108: each of the electronic apparatuses 2 controlled by the feedback module 704 uploads the feedback data to the control host 1 via the second network module 28 and the second network 6.

Step S110: the control host 1 receives a plurality of feedback data corresponding to the control parameter from the electronic apparatuses 2, and stores the received feedback data. Then, the control host 1 may execute a statistic analysis process (such as Big Data analysis) on the pluralities of the received feedback data for obtaining the analysis data, and stores the analysis data in the database 12 if an analysis condition satisfies (such as administrator manually triggering, a specific time elapsing, or a number of the received feedback data being matched with a specific number).

One of the exemplary embodiments, above-mentioned feedback operation is an operation of selecting one of a plurality of feeling options (such as "too cold, "comfortable", and "too hot"). Above-mentioned analysis data may be a statistical result about proportion or number of the past feeling options, or a prediction result about proportion or number of the future feeling options.

The present disclosed example has ability of making people with stronger intention in response to environment status and improving accuracy of the responses via actively giving notice for assisting people in instant feedback when they are in the environment.

One of the exemplary embodiments, the guiding method may further comprise following steps.

Step S112: the control host 1 may output analysis data via the output apparatus 102 as a reference of adjusting the external apparatus 3 manually for the administrator.

Thus, the administrator can directly view the analysis data after analysis without analyzing a large amount feedback data manually.

Step S114: the control host 1 determines the new control parameter according to the analysis data.

Step S116: the control host 1 transfers the new control parameter to the external apparatus 3 via the transmission apparatus 104 and the second network 6.

One of the exemplary embodiments, the control host 1 directly transfers the new control parameter to the external apparatus 3 (step S1160) via the transmission apparatus 104 and the second network 6.

One of the exemplary embodiments, the control host 1 transfers the new control parameter to the wireless apparatus 4 (step S1162) via the transmission apparatus 104 and the second network 6, the wireless apparatus 4 forwards the received control parameter to the external apparatus 3 (step S1164) via the third network 8.

Step S118: the external apparatus 3 adjusts the environmental status of the environment e according to the new control parameter after receipt of the new control parameter.

Thus, the present disclosed example can appropriately adjust the control parameter of the external apparatus 3 according to the analysis result of a large amount of feedback data, so as to make the environmental status of the environment e is closer to the expectation of most of the people.

Compare to the configuration method of adjusting the control parameter according to the feedback data of single person, the present disclosed example can mitigate the effect of a few of feedback data of extreme feeling of environment by a few of extreme persons (such as people preferred to very high or low temperature environment), so as to make the environmental status adjusted by the external apparatus 3 according to the determined control parameter is closer to the expectation of most of the people.

Figure 9:
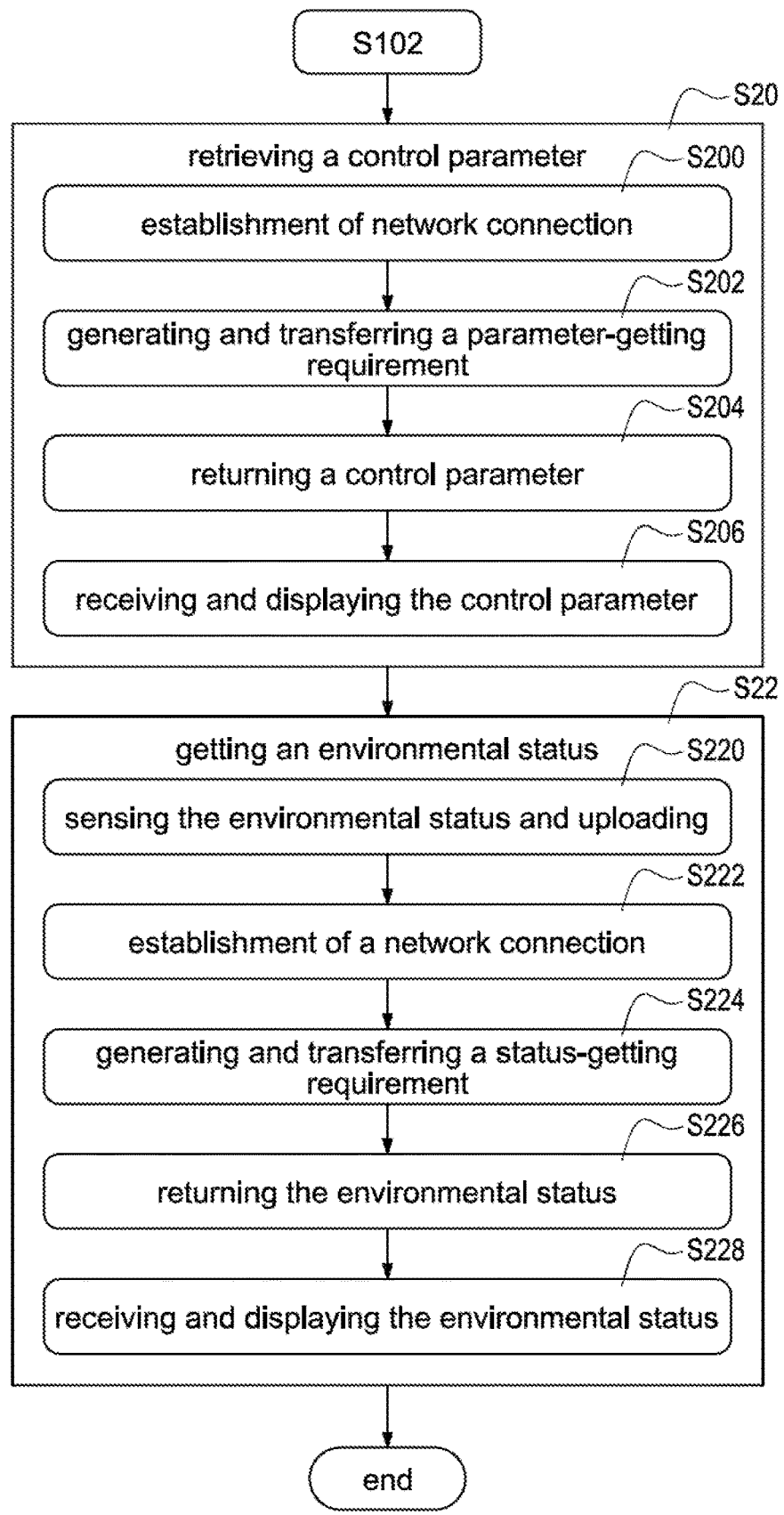
FIG. 9 is a partial flowchart of a method of guiding occupant to make demand response to environment status according to a second embodiment of the present disclosed example.

Please refer to FIG. 8 and FIG. 9 simultaneously, FIG. 9 is a partial flowchart of a method of guiding occupant to make demand response to environment status according to a second embodiment of the present disclosed example. In this embodiment, a set of identification codes of the wireless apparatus 4 sending the trigger message is recorded in the trigger message.

The electronic apparatus 2 may execute a step S20 and/or a step S22 after receiving the trigger message (step S102). Step S20: the external apparatus 2 retrieves the control parameter of the external apparatus 3 arranged in the same environment e, and displays the retrieved control parameter. Step S22: the electronic apparatus 2 retrieves the environmental status sensed by the wireless apparatus 4 arranged in the same environment e, and displays the retrieved environmental status.

More specifically, in the step S20, the electronic apparatus 2 first establishes a network connection with an apparatus (such as the control host 1, the external apparatus 3 or the wireless apparatus 4) storing the current control parameter of the external apparatus 3 (step S200).

One of the exemplary embodiments, the electronic apparatus 2 establishes a second network connection with the control host 1 via the second network module 28 and the second network 6.

One of the exemplary embodiments, the first network 5 and the third network 8 are two different and independent communication networks, the electronic apparatus 2 first establishes a first network connection with the wireless apparatus 4 via the first network module 26, and then establishes a third network connection with the external apparatus 3 via the wireless apparatus 4 and the third network 8. Thus, the electronic apparatus may be connected to the external apparatus 3 via the first network connection and the third network connection.

One of the exemplary embodiments, the wireless apparatus 4 is responsible for forwarding the control parameter from the control host 1 to the external apparatus 3 (namely, the wireless apparatus 4 may store the control parameter), the electronic apparatus 2 may establishes the first network connection with the wireless apparatus 4 via the first network module 26 and the first network 5.

Then, the electronic apparatus 2 controlled by the requirement module 706 retrieves the identification codes via analyzing the received trigger message, generates a parameter-getting requirement according to the retrieved identification codes, and sends the generated parameter-getting requirement to the control host 1, the external apparatus 3 or the wireless apparatus 4 via the established network connection (step S202).

Then, the control host 1, the external apparatus 3 or the wireless apparatus 4 may retrieve the current control parameter of the corresponding external apparatus 3 according to the identification codes of the received parameter-getting requirement, and return the retrieved control parameter to the electronic apparatus 2 via the established network connection (step S204).

Finally, the electronic apparatus 2 controlled by the reminding module 708 receives the current control parameter from the control host 1, the external apparatus 3 or the wireless apparatus 4 via the established network connection, and displays the control parameter (step S206).

Thus, the person can view the current control parameter of the external apparatus 3 arranged in the same environment e via the electronic apparatus 2 immediately, and make it as a reference of the response to environment status.

Moreover, in the step S22, the wireless apparatus 4 senses the environmental status of the environment e by the sense component 46 continuously, and uploads the sensed environmental status to the control host 1 via the second network 6 periodically or intermittently (step S220).

Besides, the electronic apparatus 2 may establish a network connection with the apparatus (such as control host 1 or the wireless apparatus 4) storing the environmental status of the environment e (step S222).

Then, the electronic apparatus 2 controlled by the requirement module 706 retrieves the identification codes via analyzing the received trigger message, generates a status-getting requirement according to the retrieved identification codes, and sends the generated status-getting requirement to the control host 1 or the wireless apparatus 4 via the established network connection (step S224).

Then, the control host 1 or the wireless apparatus 4 may retrieve the sensed environmental status by the corresponding wireless apparatus 4 according to the identification codes of the received status-getting requirement, and return the retrieved environmental status to the electronic apparatus 2 via the established network connection (step S226).

Finally, the electronic apparatus 2 controlled by the reminding module 708 receives the environmental status from the control host 1 or the wireless apparatus 4 via the established network connection, and displays the environmental status (step S228).

Thus, the person can view the current environmental status of the environment e via the electronic apparatus 2 immediately, and make it as a reference of the response to environment status.

Please be noted that both the step S20 and the step S22 are performed in this embodiment, but this specific example is not intended to limit the scope of the present disclosed example. One of the exemplary embodiments, either the step S20 or the step S22 is performed.

Figure 10:
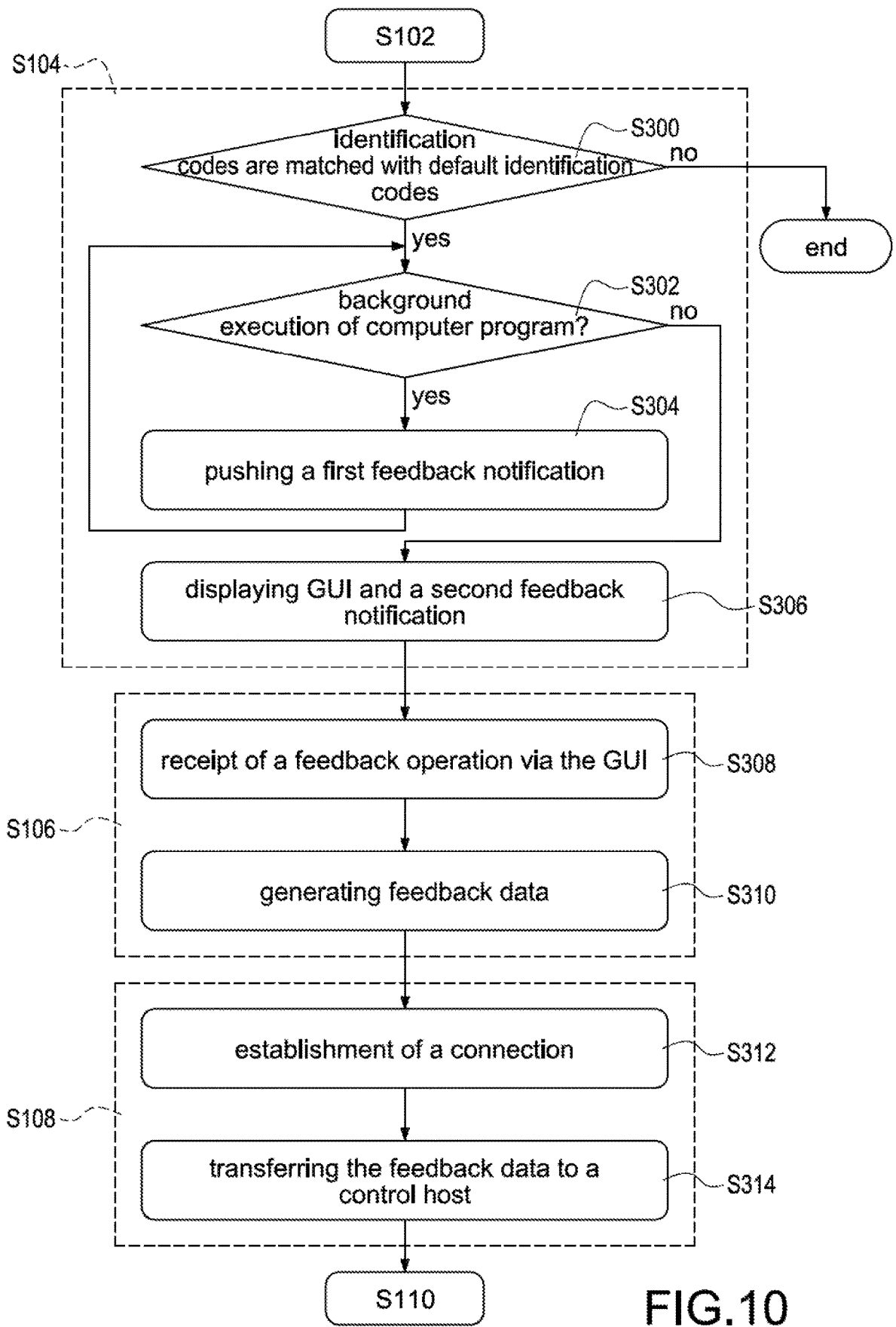
FIG. 10 is a partial flowchart of a method of guiding occupant to make demand response to environment status according to a third embodiment of the present disclosed example.
Figure 11:
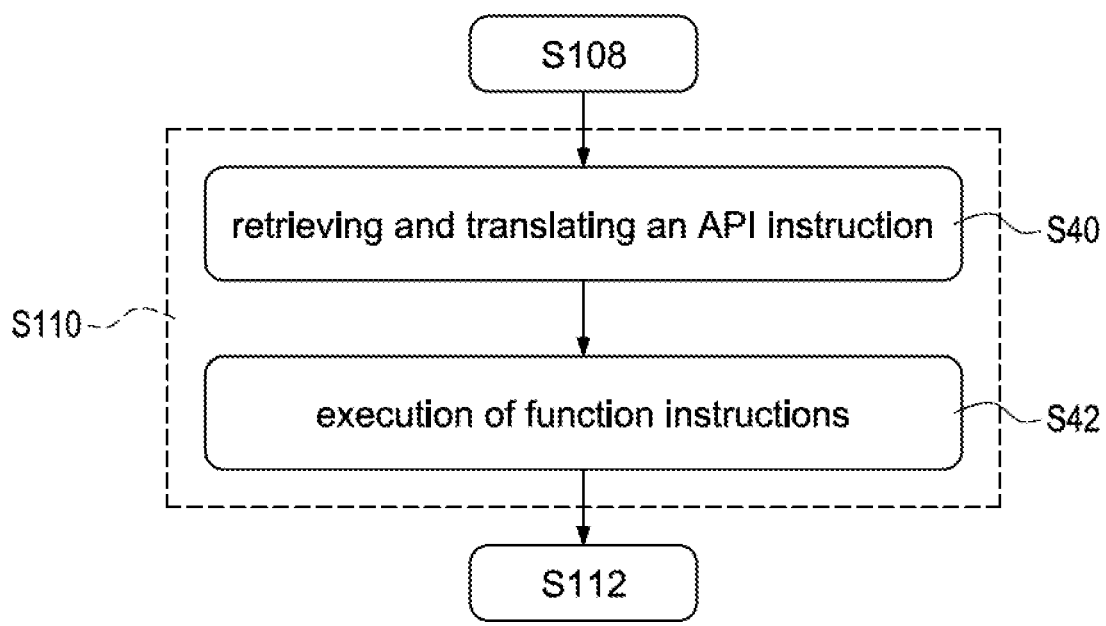
FIG. 11 is a partial flowchart of a method of guiding occupant to make demand response to environment status according to a fourth embodiment of the present disclosed example.

Please refer to FIG. 8 and FIG. 10 simultaneously, FIG. 10 is a partial flowchart of a method of guiding occupant to make demand response to environment status according to a third embodiment of the present disclosed example. In this embodiment, a set of identification codes of the wireless apparatus 4 sending the trigger message is recorded in the trigger message. Compare to the embodiment shown in FIG. 8, the step S104 of the guiding method of the fourth embodiment comprises following steps.

Step S300: the electronic apparatus 2 determines whether the identification codes attached to the trigger message are matched with any set of default identification codes via the recognition module 710 after receipt of the trigger message.

If the electronic apparatus 2 determines that the identification codes are matched with any set of default identification codes, the electronic apparatus 2 determines that the person has a permission of feedback and performs the step S302. Otherwise, the electronic apparatus 2 determines that the person doesn't have the permission of feedback, and terminates the guiding method.

For example, please refer to FIG. 7, the building comprising a plurality of environment e1-e4 simultaneously. Moreover, the person only has a permission of entering the partial environment (taking the environments e1-e3 for example) or a permission of making a response to the environment status of the partial environment. In this example, the identification codes of the wireless apparatus 4A-4D arranged in the environment e1-e3 are configured as the default identification codes, and the computer program 200 has been configured correspondingly. Thus, the person is unable to give feedback of the environmental status of environment e4 even the person enters the environment e4 which the person doesn't have the permission of feedback. By above-mention manner, the present disclosed example can effectively prevent the status from occurring that the person without the permission makes a response to the environmental status maliciously or erroneously, such that the accuracy of the analysis data is reduced. Please refer to FIG. 10, the step S302 is performed then: the electronic apparatus 2 determining the computer program 200 is executed in background or foreground.

If the electronic apparatus 2 determine that the computer program 200 is executed in background, a step S304 is performed. Otherwise, a step S306 is performed by the electronic apparatus 2.

Step S304: the electronic apparatus 2 push a feedback notification (first feedback notification) via the push module 712 and the human-machine interface 24 for instructing the person to operate the electronic apparatus 2 to make the computer program 200 switch to foreground. Then the electronic apparatus 2 performs the step S302 again for determining whether the computer program switches to foreground.

Please be noted that the step S304 may not be performed again (or being performed each time a specific time interval elapses) if the electronic apparatus 2 determines that the computer program 200 is still in background, so as to prevent the person from feeling tired caused by pushing the same first feedback notification repeatedly.

The electronic apparatus 2 performs a step S306 if determining that the computer program 200 is in foreground: the electronic apparatus 2 rendering the GUI via the rendering module 714, displaying the rendered GUI via the human-machine interface 24, and displaying another feedback notification (second feedback notification) via the GUI for instructing a person to input the feedback operation.

Compare to the embodiment shown in FIG. 8, the step S106 of the guiding method of this embodiment comprises following steps.

Step S308: the electronic apparatus 2 receives a feedback operation from the person via the GUI.

One of the exemplary embodiments, the electronic apparatus 2 renders a plurality of feeling options (such as "too bright", "good", or "too dark") respectively instructing the different feelings of the environment via the GUI. Above feedback operation is an operation of selecting one of the feeling options.

Step S310: the electronic apparatus 2 generates the corresponding feedback data according to the received feedback operation.

One of the exemplary embodiments, above-mentioned feedback data is used to indicate the feeling option selected by the person.

Compare to the embodiment shown in FIG. 8, the step S108 of the guiding method of this embodiment comprises following steps.

Step S312: the electronic apparatus 2 controlled by the connection-establishing module 716 establishes a wireless connection with the wireless apparatus 4 sent the trigger message through the first network 5 via the first network module 26.

One of the exemplary embodiments, the electronic apparatus 2 establishes a network connection with the control host 1 directly via the second network 6.

Step S314: the electronic apparatus 2 transfers the generated feedback data to the wireless apparatus 4 via the established wireless connection. Then, the wireless apparatus 4 forwards the received feedback data to the control host 1 via the second network 6.

In other words, the feedback data is transferred to the control host 1 along a path of the electronic apparatus 2, the first network 5, the wireless apparatus 4 and the second network 6. The present disclosed example can make the electronic apparatus 2 upload the feedback data to the control host 1 without connecting to the second network 6 directly via using the wireless apparatus 4 to forward the feedback data to the control host 1. Moreover, because the electronic apparatus 2 is not necessary to establish additional network connection with the control host 1, the present disclosed example can reduce the number of connections of the control host 1, so as to reduce the loading of the control host 1.

One of the exemplary embodiments, the electronic apparatus 2 directly transfers the feedback data to the control host 1 via the network connection established in the second network 6.

The present disclosed example can prevent the forwarding transmission from transmission delay or data loss via executing the data transmission with the control host 1 directly, so as to improve the transmission speed and transmission success rate.

Please refer to FIG. 1 to FIG. 6, FIG. 8 and FIG. 11, FIG. 11 is a partial flowchart of a method of guiding occupant to make demand response to environment status according to a fourth embodiment of the present disclosed example. In this embodiment, the control host 1 comprises the interface server 10 and the database 12. The feedback data comprises storing API instruction.

Compare to the embodiment shown in FIG. 8, the step S110 of the guiding method of the fourth embodiment comprises following steps.

Step S40: the interface server 10 retrieves the API instruction and translates the retrieved API instruction into a plurality of function instructions of the corresponding library.

Step S42: the interface server 10 executes the obtained function instructions for executing the corresponding function.

For example, the interface server 10 may analyze the storing API instruction attached to each feedback data, and translate the analyzed storing API instruction into a plurality of storing function instructions of the library according to a predetermined correspondence relationship between the API instructions and the function instructions if receipt of any feedback data. Then, the interface server 10 executes the obtained storing function instruction for saving the feedback data in the database 12.

One of the examples, the interface server 10 may translate a statistic API instruction into a plurality of statistic function instructions of the library if receipt of the statistic API instruction. Then, the interface server 10 executes the obtained statistic function instructions for executing a statistic analysis process on the pluralities of the feedback data storing in the database 12 for obtaining the analysis data, and stores the analysis data in the database 12.

Thus, the developer may directly use the simple API instructions for implementing the high-level or complex functions without the use of a large amount of above-mentioned complex function instructions via the function of translation of API instruction of the present disclosed example when programming, so as to reduce the complexity of the program and the difficulty of development significantly.

What is claimed is:

1. An environment control system, comprising:
   an external apparatus configured to adjust an environmental status according to a control parameter;
   a wireless apparatus arranged in the same environment as the external apparatus, the wireless apparatus being configured to broadcasting in a wireless manner a trigger message in a first network;
   a control host connected to the external apparatus and the wireless apparatus via a second network, the control host is configured to receive a plurality of feedback data corresponding to the control parameter and/or the environmental status, execute a statistic analysis process on the pluralities of the feedback data for obtaining analysis data, and store the analysis data; and
   a computer program installed in an electronic apparatus, the computer program being configured to control the electronic apparatus to output a feedback notification after receipt of the trigger message via the first network, control the electronic apparatus to generate the corresponding feedback data after receipt of a feedback operation instructing a feedback of feeling of the environment, and control the electronic apparatus to transfer the feedback data via the second network.

2. The environment control system according to claim 1, wherein the control host comprises:
   an output apparatus configured to output analysis data;
   a control apparatus connected to the output apparatus, the control apparatus being configured to generate the control parameter according to the analysis data; and
   a transmission apparatus connected to the control apparatus and the second network, the transmission apparatus being configured to transfer the control parameter to the external apparatus via the second network or transfer the control parameter to the wireless apparatus via the second network for making the wireless apparatus forwarding the control parameter to the external apparatus via a third network.

3. The environment control system according to claim 2, wherein the computer program comprises a reminding module, the reminding module is configured to control the electronic apparatus to receive the control parameter from the control host, the wireless apparatus or the external apparatus after receipt of the trigger message, and display the control parameter.

4. The environment control system according to claim 1, wherein the wireless apparatus comprises a sense component, the sense component is configured to sense the environmental status, the wireless apparatus transfers the environmental status to the control host via the second network; the computer program comprises a reminding module, the reminding module is configured to control the electronic apparatus to get the environmental status from the control host or the wireless apparatus after receipt of the trigger message, and display the environmental status.

5. The environment control system according to claim 4, wherein the trigger message comprises identification codes of the wireless apparatus; the computer program further comprises a requirement module, the requirement module is configured to control the electronic apparatus to generate a parameter-getting requirement according to the identification codes, and transfer the parameter-getting requirement to the control host or the wireless apparatus.

6. The environment control system according to claim 1, wherein the computer program comprises:
   a push module configured to control the electronic apparatus to push a first feedback notification for instructing a person to operate the electronic apparatus to make the computer program switch to foreground if the computer program is executed in background and receipt of the trigger message; and
   a rendering module configured to control the electronic apparatus to render a GUI and display the GUI if the computer program is executed in foreground and receipt of the trigger message;
   wherein the computer program is configured to control the electronic apparatus to display a second feedback notification and receive the feedback operation of selecting one of a plurality of feeling options respectively instructing the different feelings of the environment via the GUI, the feedback is configured to instruct the selected feeling option.

7. The environment control system according to claim 1, wherein a maximum transmission speed in the second network is faster than a maximum transmission speed in the first network, and a communication standard of the second network is incompatible with a communication standard of the first network.

8. The environment control system according to claim 1, wherein a network type of the first network is the same as a network type of the second network.

9. The environment control system according to claim 1, wherein the computer program comprises a connection-establishing module, the connection-establishing module is configured to control the electronic apparatus establish a wireless connection with the wireless apparatus through the first network; the computer program controls the electronic apparatus to transfer the feedback data to the wireless apparatus through the wireless connection for making the wireless apparatus forward the feedback data to the control host through the second network.

10. The environment control system according to claim 1, wherein the control host comprises an interface server connected to the second network and a database connected to the interface server, the feedback data comprises a storing API instruction.

11. The environment control system according to claim 10, wherein the interface server comprises:
   a translation module configured to control the interface to translate the storing API instruction of each of the feedback data into a plurality of storing function instructions of a library if receipt of each of the feedback data, and translate a statistic API instruction into a plurality of statistic function instructions of the library if receipt of the statistic API instruction; and an execution module configured to execute the storing function instructions for classifying the feedback data and storing the feedback data in the database, execute the statistic function instructions for executing the statistic analysis process on the pluralities of the feedback data for obtaining the analysis data, and store the analysis data in the database.

12. A method of guiding occupant to make demand response to environment status applied to an environment control system comprising an external apparatus, a wireless apparatus arranged in the same environment as the external apparatus, a control host and a computer program installed in an electronic apparatus, comprising following steps:
   a) adjusting an environmental status according to a control parameter at an external apparatus;
   b) broadcasting a trigger message in a first network at a wireless apparatus;
   c) controlling the electronic apparatus to output a feedback notification after receipt of the trigger message from the first network via execution of the computer program;
   d) generating feedback data corresponding to the control parameter and/or the environmental status after receipt of a feedback operation instructing a feedback of feeling of the environment, and transferring the feedback data to the control host via the second network; and
   e) receiving a plurality of the feedback data corresponding to the control parameter and/or the environmental status, execute a statistic analysis process on the pluralities of the feedback data for obtaining analysis data, and store the analysis data.

13. The method according to claim 12, further comprising following steps of:
   f1) generate the control parameter according to the analysis data at the control host;
   f2) transferring the control parameter to the external apparatus via the second network or the wireless apparatus for making the external apparatus adjust the environmental status according to the control parameter; and
   f3) outputting the analysis data via an output apparatus.

14. The method according to claim 13, wherein the trigger message comprises identification codes of the wireless apparatus, the method further comprises following steps of:
   g1) controlling the electronic apparatus to establish a connection with the control host, the wireless apparatus or the external apparatus after receipt of the trigger message;
   g2) generating a parameter-getting requirement according the identification codes, and transferring the parameter-getting requirement to the control host, the wireless apparatus or the external apparatus; and
   g3) receiving the control parameter of the external apparatus from the control host, the wireless apparatus or the external apparatus, and displaying the control parameter.

15. The method according to claim 12, further comprising following steps of:
   h1) sensing the environmental status and transferring the environmental status to the control host at the wireless apparatus;
   h2) controlling the electronic apparatus to establish a connection with the control host or the wireless apparatus after receipt of the trigger message;
   h3) generating a status-getting requirement according to identification codes, and transferring the status-getting requirement to the control host or the wireless apparatus; and
   h4) receiving the environmental status from the control host or the wireless apparatus, and displaying the environmental status.

16. The method according to claim 12, wherein the step c) comprises following steps of:
   c1) controlling the electronic apparatus to push a first feedback notification for instructing a person to operate the electronic apparatus to make the computer program switch to foreground if the computer program is executed in background and receipt of the trigger message; and
   c2) controlling the electronic apparatus to render a GUI, display the GUI and display a second feedback notification via the GUI for indicating the person to input the feedback operation if the computer program is executed in foreground and receipt of the trigger message;
   wherein, the step d) is configured to receive the feedback operation of selecting one of a plurality of feeling options respectively instructing the different feelings of the environment via the GUI, the feedback is configured to instruct the selected feeling option.

17. The method according to claim 12, wherein the step d) is configured to transfer the feedback data to the control host via a second network, a maximum transmission speed in the second network is faster than a maximum transmission speed in the first network, and a communication standard of the second network is incompatible with a communication standard of the first network.

18. The method according to claim 12, wherein step d) is configured to transfer the feedback data to the control host via a second network, and a network type of the first network is the same as a network type of the second network.

19. The method according to claim 18, wherein the wireless apparatus is connected to the control host via the second network, the step d) is configured to comprise following steps of:
   d1) generating the feedback data corresponding the feedback operation after receipt of the feedback operation;
   d2) establishing a wireless connection with the wireless apparatus via the first network; and
   d3) transferring the feedback data to the wireless device via the wireless connection for making the wireless apparatus forwarding the feedback data to the control host.

20. The method according to claim 12, wherein the control host comprises an interface server and a database, the feedback data comprises a storing API instruction;
   the step e) comprises following steps of:
   e1) translating the storing API instruction of each of the feedback data into a plurality of storing function instructions of a library at the interface server if receipt of the feedback data;
   e2) executing the storing function instruction for classifying the feedback data and storing the feedback data in the database;
   e3) translating a statistic API instruction into a plurality of statistic function instructions of the library if receipt of the statistic API instruction; and
   e4) executing the statistic function instructions for executing the statistic analysis process on the pluralities of the feedback data for obtaining the analysis data, and store the analysis data in the database.

* * * * *